US010287906B2

(12) United States Patent
Rice et al.

(10) Patent No.: US 10,287,906 B2
(45) Date of Patent: May 14, 2019

(54) TURBINE SHROUD WITH FULL HOOP CERAMIC MATRIX COMPOSITE BLADE TRACK AND SEAL SYSTEM

(71) Applicant: Rolls-Royce North American Technologies, Inc., Indianapolis, IN (US)

(72) Inventors: Edward C. Rice, Indianapolis, IN (US); Daniel K. Vetters, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 711 days.

(21) Appl. No.: 15/163,079

(22) Filed: May 24, 2016

(65) Prior Publication Data
US 2017/0342849 A1    Nov. 30, 2017

(51) Int. Cl.
| | | |
|---|---|---|
| F01D 11/00 | (2006.01) |
| F01D 25/12 | (2006.01) |
| F01D 25/24 | (2006.01) |
| F01D 9/04 | (2006.01) |
| F01D 17/10 | (2006.01) |
| F01D 11/14 | (2006.01) |

(52) U.S. Cl.
CPC .............. *F01D 11/005* (2013.01); *F01D 9/04* (2013.01); *F01D 17/105* (2013.01); *F01D 25/12* (2013.01); *F01D 25/24* (2013.01); *F01D 11/14* (2013.01); *F05D 2220/32* (2013.01); *F05D 2240/11* (2013.01); *F05D 2300/10* (2013.01); *F05D 2300/6033* (2013.01)

(58) Field of Classification Search
CPC .......... F01D 9/04; F01D 11/005; F01D 11/14; F01D 11/24; F01D 17/105; F01D 25/12; F01D 25/24; F05D 2240/11
USPC ....................................................... 415/173.1
See application file for complete search history.

(56) References Cited

U.S. PATENT DOCUMENTS

| | | |
|---|---|---|
| 3,601,414 A | 8/1971 | Rao |
| 4,087,199 A | 5/1978 | Hemsworth et al. |
| 4,477,086 A | 10/1984 | Feder et al. |

(Continued)

FOREIGN PATENT DOCUMENTS

| | | |
|---|---|---|
| DE | 102008044450 A1 | 2/2009 |
| EP | 1965030 A2 | 9/2008 |

(Continued)

OTHER PUBLICATIONS

Corman, Gregory S. and Luthra, Krishan L.; Melt Infiltrated Ceramic Composites (Hipercomp®) for Gas Turbine Engine Applications; DOE/CE/41000-3; May 1994-Sep. 2005; pp. 1-507.

(Continued)

*Primary Examiner* — Ninh H Nguyen
*Assistant Examiner* — Jason Davis
(74) *Attorney, Agent, or Firm* — Barnes & Thornburg LLP

(57) ABSTRACT

A gas turbine engine includes a blade track, a support assembly, and a seal system. The blade track is arranged around a central axis of the gas turbine engine to direct gasses through the gas turbine engine. The support assembly is arranged around the blade track to support the blade track relative to the central axis. The seal system is configured to block fluid communication between pressurized cavities formed in the support assembly.

20 Claims, 3 Drawing Sheets

(56) References Cited

U.S. PATENT DOCUMENTS

| | | | |
|---|---|---|---|
| 4,646,810 A | 3/1987 | Lardellier | |
| 4,679,981 A | 7/1987 | Guibert et al. | |
| 4,863,345 A | 9/1989 | Thompson et al. | |
| 5,163,809 A | 11/1992 | Akgun et al. | |
| 5,197,853 A * | 3/1993 | Creevy | F01D 11/005 |
| | | | 29/889.22 |
| 5,738,490 A | 4/1998 | Pizzi | |
| 5,993,150 A * | 11/1999 | Liotta | F01D 11/10 |
| | | | 415/115 |
| 6,142,731 A | 11/2000 | Dewis et al. | |
| 6,315,519 B1 | 11/2001 | Bagepalli et al. | |
| 6,517,313 B2 | 2/2003 | Rogers | |
| 6,726,448 B2 | 4/2004 | McGrath et al. | |
| 6,733,233 B2 | 5/2004 | Jasklowski et al. | |
| 6,758,386 B2 | 7/2004 | Marshall et al. | |
| 6,758,653 B2 | 7/2004 | Morrison | |
| 6,896,483 B2 | 5/2005 | Dierksmeier et al. | |
| 6,910,853 B2 | 6/2005 | Corman et al. | |
| 7,090,459 B2 | 8/2006 | Bhate et al. | |
| 7,195,452 B2 | 3/2007 | Allan et al. | |
| 7,217,089 B2 | 5/2007 | Durocher et al. | |
| 7,234,306 B2 | 6/2007 | Aumont et al. | |
| 7,374,396 B2 | 5/2008 | Martin et al. | |
| 7,435,049 B2 | 10/2008 | Ghasripoor et al. | |
| 7,641,442 B2 | 1/2010 | Denece et al. | |
| 7,665,960 B2 | 2/2010 | Shi et al. | |
| 7,771,160 B2 | 8/2010 | Shi et al. | |
| 7,914,256 B2 | 3/2011 | Xie et al. | |
| 7,988,395 B2 | 8/2011 | Steffier | |
| 8,047,773 B2 | 11/2011 | Bruce et al. | |
| 8,061,977 B2 | 11/2011 | Keller et al. | |
| 8,079,807 B2 | 12/2011 | Shapiro et al. | |
| 8,092,160 B2 | 1/2012 | Shi et al. | |
| 8,167,546 B2 | 5/2012 | Shi et al. | |
| 8,235,670 B2 | 8/2012 | Morrison et al. | |
| 8,257,029 B2 | 9/2012 | Habarou et al. | |
| 8,322,983 B2 | 12/2012 | Marini | |
| 8,328,505 B2 | 12/2012 | Shi et al. | |
| 8,496,431 B2 | 7/2013 | Habarou et al. | |
| 8,511,975 B2 | 8/2013 | Shi et al. | |
| 8,555,647 B2 | 10/2013 | Dimascio et al. | |
| 8,568,091 B2 | 10/2013 | McCaffrey | |
| 8,651,497 B2 | 2/2014 | Tholen et al. | |
| 8,684,689 B2 | 4/2014 | Guo et al. | |
| 8,739,547 B2 | 6/2014 | Jarmon et al. | |
| 8,740,552 B2 | 6/2014 | Marusko et al. | |
| 8,770,931 B2 | 7/2014 | Alvanos et al. | |
| 8,784,052 B2 | 7/2014 | Shi et al. | |
| 8,790,067 B2 | 7/2014 | McCaffrey et al. | |
| 8,801,372 B2 | 8/2014 | Shi et al. | |
| 8,814,173 B2 | 8/2014 | Motzkus et al. | |
| 8,834,106 B2 | 9/2014 | Luczak | |
| 8,926,270 B2 | 1/2015 | Karafillis et al. | |
| 9,011,079 B2 | 4/2015 | Coign et al. | |
| 9,850,773 B2 * | 12/2017 | Zelesky | F16J 15/0887 |
| 9,920,647 B2 * | 3/2018 | Jones | F01D 11/24 |
| 2004/0047726 A1 | 3/2004 | Morrison | |
| 2005/0123389 A1 | 6/2005 | Morris et al. | |
| 2009/0208322 A1 | 8/2009 | McCaffrey | |
| 2010/0111678 A1 | 5/2010 | Habarou et al. | |
| 2010/0150703 A1 | 6/2010 | Gonzalez et al. | |
| 2010/0232941 A1 | 9/2010 | Smoke et al. | |
| 2011/0052384 A1 | 3/2011 | Shi et al. | |
| 2011/0057394 A1 | 3/2011 | Halling | |
| 2011/0150635 A1 | 6/2011 | Motzkus et al. | |
| 2011/0274538 A1 | 11/2011 | Shi et al. | |
| 2012/0070276 A1 | 3/2012 | Shi et al. | |
| 2012/0107107 A1 | 5/2012 | Chan et al. | |
| 2012/0156029 A1 | 6/2012 | Karafillis et al. | |
| 2012/0177488 A1 | 7/2012 | Corman | |
| 2012/0247124 A1 | 10/2012 | Shapiro et al. | |
| 2012/0263582 A1 | 10/2012 | Foster et al. | |
| 2012/0301269 A1 | 11/2012 | Alvanos et al. | |
| 2012/0301312 A1 | 11/2012 | Berczik et al. | |
| 2012/0301303 A1 | 12/2012 | Alvanos et al. | |
| 2012/0308367 A1 | 12/2012 | Luczak | |
| 2013/0008176 A1 | 1/2013 | Shi et al. | |
| 2013/0011248 A1 | 1/2013 | Croteau et al. | |
| 2013/0177384 A1 | 7/2013 | Coign et al. | |
| 2013/0177411 A1 | 7/2013 | Weber et al. | |
| 2014/0202168 A1 | 7/2014 | Shapiro et al. | |
| 2014/0260320 A1 | 9/2014 | Graves et al. | |
| 2014/0271144 A1 | 9/2014 | Landwehr et al. | |
| 2014/0341707 A1 | 11/2014 | Jones et al. | |
| 2014/0341711 A1 | 11/2014 | Taylor et al. | |
| 2015/0044044 A1 | 2/2015 | Sippel et al. | |
| 2016/0123171 A1 | 5/2016 | Westphal et al. | |
| 2016/0177786 A1 | 6/2016 | Sippel et al. | |
| 2016/0208635 A1 | 7/2016 | Vetters et al. | |
| 2016/0222812 A1 | 8/2016 | Sippel et al. | |

FOREIGN PATENT DOCUMENTS

| | | | |
|---|---|---|---|
| EP | 2299061 A2 | 3/2011 | |
| EP | 2589774 A1 | 5/2013 | |
| EP | 2604805 A2 | 6/2013 | |
| EP | 2690257 A2 | 1/2014 | |
| FR | 2580033 A1 | 10/1986 | |
| FR | 2980235 B1 | 4/2015 | |
| GB | 2235730 A | 3/1991 | |
| GB | 2468768 A | 9/2010 | |
| GB | 2480766 A | 11/2011 | |
| JP | 09250304 A | 9/1997 | |
| JP | 09264104 A | 10/1997 | |
| WO | 2010058137 A1 | 5/2010 | |
| WO | 2011157956 A1 | 12/2011 | |
| WO | 2014120334 A1 | 8/2014 | |
| WO | 2014143225 A1 | 9/2014 | |
| WO | 2014163674 A1 | 10/2014 | |

OTHER PUBLICATIONS

Bloxer, Matt L.; Thermal Stress in High Temperature Cylindrical Fasteners; NASA Technical Memorandum; May 1988; pp. 1-12.
Bloxer, Matt L. and McWithey, Robert R.; Theoretical Basis for Design of Thermal-Stress-Free Fasteners; NASA Technical Paper; Dec. 1983; pp. 1-26.
Extended EP Search Report completed Jan. 26, 2018 and issued in connection with EP Patent Appln. No. 17167778.4.
Extended European Search Report, European Application No. 17167781.8-1610, dated Oct. 25, 2017, 8 pages.

* cited by examiner

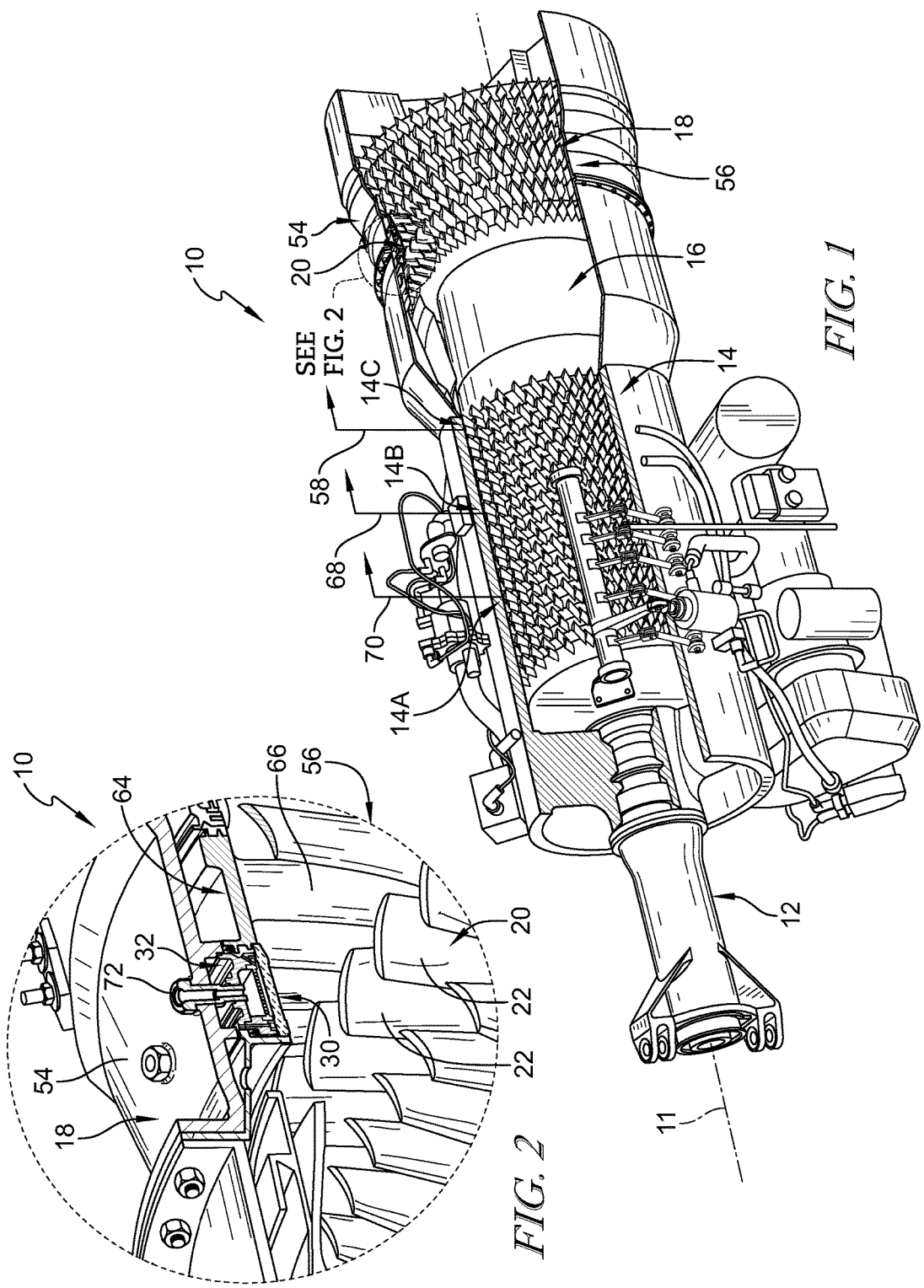

TURBINE SHROUD WITH FULL HOOP CERAMIC MATRIX COMPOSITE BLADE TRACK AND SEAL SYSTEM

FIELD OF THE DISCLOSURE

The present disclosure relates generally to gas turbine engines, and more specifically to seal systems for turbine sections used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

The static shrouds may be exposed to high temperatures from the products of the combustion reaction in the combustor. Typical turbines are formed to include cavities arranged to receive pressurized air from the compressor which is used to cool hot turbine components such as the static shrouds. The turbines may include seals located between the turbine components to block the hot products of the combustion reaction from flowing between the turbine components into the cavities. The seals may experience large pressure forces and can degrade when a large pressure difference is formed between the hot products of the combustion reaction and the air delivered to the cavities.

SUMMARY

The present disclosure may comprise one or more of the following features and combinations thereof.

A gas turbine engine may include a blade track, a support assembly, and a seal system. The blade track may be arranged around a central axis of the gas turbine engine. The blade track may include a leading edge, a trailing edge axially spaced apart from the leading edge, a radial outer surface that extends between the leading and trailing edges, and a radial inner surface spaced apart from the radial outer surface. The support assembly may be arranged around the blade track to support the blade track relative to the central axis.

The support assembly may be formed to define a retention cavity, a vent cavity, and a bleed cavity. The retention cavity may be configured to receive relatively high-pressure compressor air that is directed to the leading edge of the blade track to resist gases from flowing past the leading edge over the radial outer surface of the blade track. The vent cavity may be configured to receive relatively low-pressure compressor air that is directed to the trailing edge of the blade track to resist the gasses from flowing past the trailing edge over the radial outer surface of the blade track. The bleed cavity may fluidly interconnect the retention cavity with the vent cavity and may be configured to receive intermediate-pressure compressor air.

The seal system may include a first seal and a second seal. The first seal may be configured to block fluid communication between the retention cavity and the bleed cavity. The second seal may be configured to block fluid communication between the bleed cavity and the vent cavity so that a pressure difference across either of the first and second seals is less than a pressure difference between the retention cavity and the vent cavity.

In some embodiments, the gas turbine engine may include a compressor having a plurality of compressor stages. The bleed cavity may be fluidly connected to a first of the plurality of compressor stages.

In some embodiments, the retention cavity may be fluidly connected to a second of the plurality of compressor stages. The second of the plurality of compressor stages may be located downstream of the first of the plurality of compressor stages.

In some embodiments, the support assembly may include a carrier arranged radially outward of and around the blade track and a track-retaining vane assembly that cooperate with the blade track to define the vent cavity. The track-retaining vane assembly may include an outer band that engages the trailing edge of the blade track and a static airfoil that extends radially inward of the outer band.

In some embodiments, the support assembly may further include a turbine case arranged around the carrier. The turbine case may cooperate with the carrier to define the retention cavity.

In some embodiments, the support assembly may further include a turbine case arranged around the track-retaining vane assembly. The carrier and the track-retaining vane assembly may cooperate to define the bleed cavity.

In some embodiments, the support assembly may include a carrier that cooperates with the blade track to define a thermal management chamber therebetween. In some embodiments, the support assembly may further include a distribution plate coupled to the carrier. The distribution plate may extend axially through the thermal management chamber to partition the thermal management chamber into a radial outer distribution cavity configured to receive and distribute cooling air circumferentially around the central axis and a radially inner cooling cavity. The distribution plate may be formed to include a plurality of holes arranged to direct the cooling air out of the distribution cavity into the cooling cavity toward the radial outer surface of the blade track. In some embodiments, the cooling cavity may be in fluid communication with the vent cavity.

In some embodiments, the gas turbine engine may further include a compressor having a plurality of compressor stages. The thermal management chamber may be fluidly connected to a first of the plurality of compressor stages. The bleed cavity may be fluidly connected to a second of the plurality of compressor stages. The retention cavity may be fluidly connected to a third of the plurality of compressor stages. The third of the plurality of compressor stages may be located downstream of the first and second of the plurality of compressor stages. The second of the plurality of compressor stages may be located downstream of the first of the plurality of compressor stages.

According to another aspect of the present disclosure, a gas turbine engine may include a turbine case, an annular turbine shroud, a blade-track retainer, a first seal, and a second seal. The turbine case may be arranged around a central axis of the gas turbine engine. The annular turbine shroud may be arranged to define an inner flow path configured to conduct hot, low-pressure gasses axially through the annular turbine shroud. The annular turbine shroud may be located radially between the turbine case and the central axis to define a retention cavity located between the annular turbine shroud and the turbine case.

The blade-track retainer may be located radially between the turbine case and the central axis to define a bleed cavity located between the blade-track retainer and the turbine case. The blade-track retainer and the annular turbine shroud may cooperate to define a vent cavity in fluid communication with the low-pressure gasses in the inner flow path. The first seal may be engaged with the turbine case and the turbine shroud to block air from escaping the retention cavity and flowing into one of the bleed cavity and the vent cavity. The second seal may be engaged with the turbine shroud and the blade-track retainer to block air from escaping the bleed cavity and flowing into the vent cavity so that a pressure difference across either of the first and second seals is less than a pressure difference between a pressure of the air in the retention cavity and a pressure of the low-pressure gasses.

In some embodiments, the annular turbine shroud may include a full hoop blade track comprising ceramic materials and a carrier comprising metallic materials and arranged around the blade track. In some embodiments, the carrier may include a support band that extends axially relative to the central axis to form a portion of the retention cavity and an aft flange that extends radially outward toward the turbine case to close an aft end of the retention cavity. The first seal may engage the aft flange of the carrier.

In some embodiments, the turbine case may include an outer band spaced apart from the support band of the carrier and a partition flange that extends radially inward toward the central axis. The partition flange may be located adjacent the aft flange of the carrier. The first seal may engage the partition flange.

In some embodiments, the blade-track retainer may include a forward flange that extends radially outward toward the turbine case to close a forward end of the bleed cavity. The second seal may engage the aft flange of the carrier and the forward flange of the blade-track retainer.

In some embodiments, the gas turbine engine may further include a compressor having a plurality of compressor stages. The bleed cavity may be fluidly connected to a first of the plurality of compressor stages.

In some embodiments, the retention cavity may be fluidly connected to a second of the plurality of compressor stages. The second of the plurality of compressor stages may be located downstream of the first of the plurality of compressor stages.

In some embodiments, the annular turbine shroud may include a blade track, a carrier, and a distribution plate. The carrier may be arranged circumferentially around the blade track to define a thermal management chamber therebetween. The distribution plate may be coupled to the carrier to partition the thermal management chamber into a radial outer distribution cavity configured to receive and distribute cooling air circumferentially around the central axis and a radially inner cooling cavity that is in fluid communication with the vent cavity.

According to another aspect of the present disclosure, a method of operating a turbine of a gas turbine engine may include a number of steps. The method may include feeding a retention cavity with a first flow of air having a first pressure, feeding a bleed cavity with a second flow of air having a second pressure, feeding a vent cavity with a third flow of air having a third pressure, providing a first seal between the retention cavity and the bleed cavity to block the first flow of air from escaping the retention cavity and entering the bleed cavity, and providing a second seal between the bleed cavity and the vent cavity to block the second flow of air from escaping the bleed cavity and entering the vent cavity.

In some embodiments, the first pressure may be greater than the second and third pressures. The second pressure may be greater than the third pressure.

These and other features of the present disclosure will become more apparent from the following description of the illustrative embodiments.

BRIEF DESCRIPTION OF THE DRAWINGS

FIG. 1 is a cut-away perspective view of a gas turbine engine having a turbine section in accordance with the present disclosure;

FIG. 2 is a detail view of FIG. 1 showing that the turbine section includes a rotating turbine wheel assembly and a turbine shroud arranged around the rotating turbine wheel assembly to provide a path for gasses to flow through the turbine;

DETAILED DESCRIPTION OF THE DRAWINGS

Figure 3:
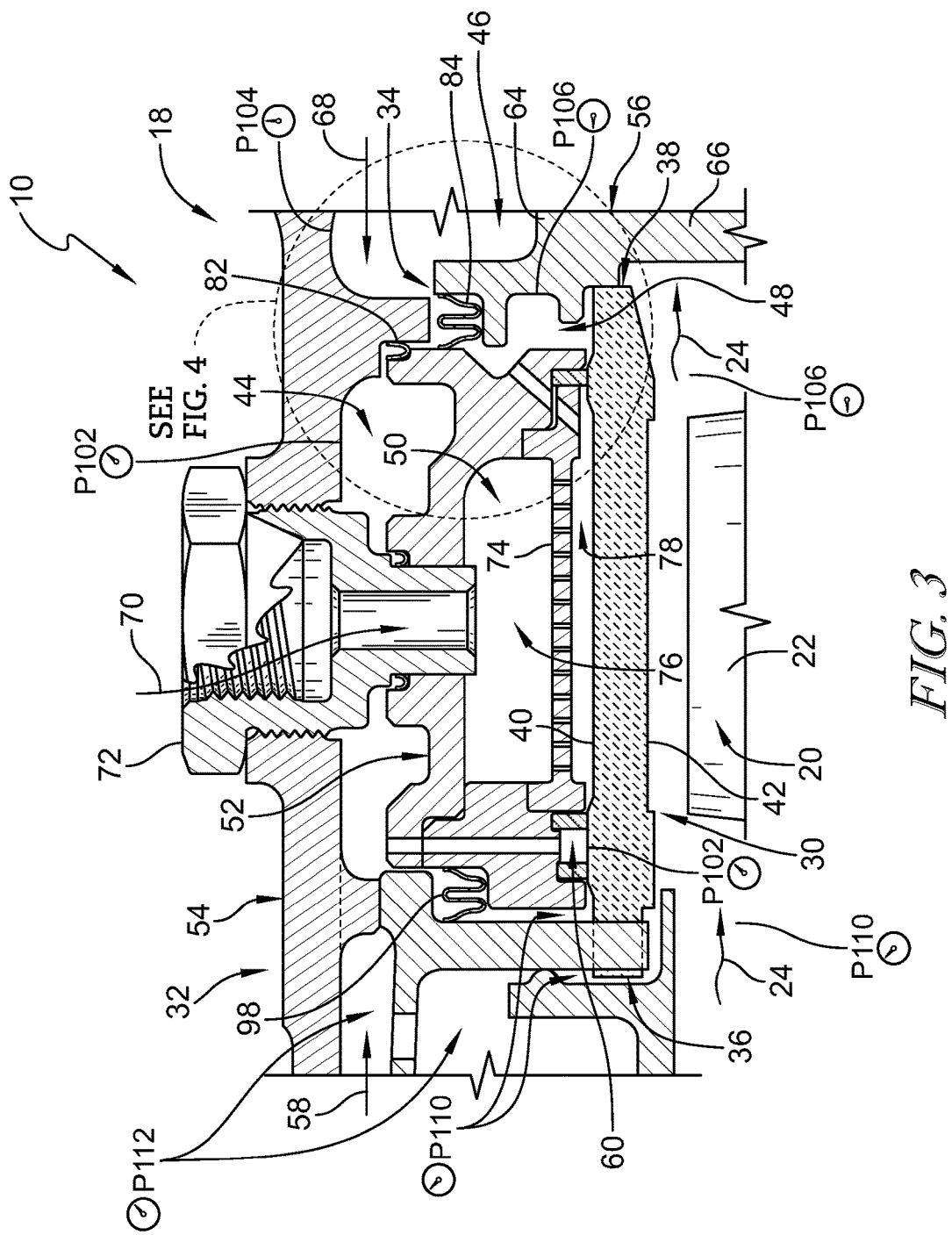
FIG. 3 is a partial cross-sectional view of the gas turbine engine of FIG. 1 showing that the turbine section is formed to define a plurality of cavities arranged to receive gasses having varying pressures to seal and cool turbine components.

For the purposes of promoting an understanding of the principles of the disclosure, reference will now be made to a number of illustrative embodiments illustrated in the drawings and specific language will be used to describe the same.

An illustrative gas turbine engine 10 includes an output shaft 12, a compressor 14, a combustor 16, and a turbine 18 as shown in FIG. 1. The turbine 18 includes a rotating turbine wheel assembly 20 and a static turbine vane assembly 56 (sometimes called a track-retaining vane assembly 56) as shown in FIGS. 1 and 2. The rotating turbine wheel assembly 20 is pushed by hot high-pressure combustion products 24 formed in the combustor 16 to cause the rotating turbine wheel assembly 20 to rotate about a central axis 11 of the engine 10; thereby driving the compressor 14 and the output shaft 12.

Figure 4:
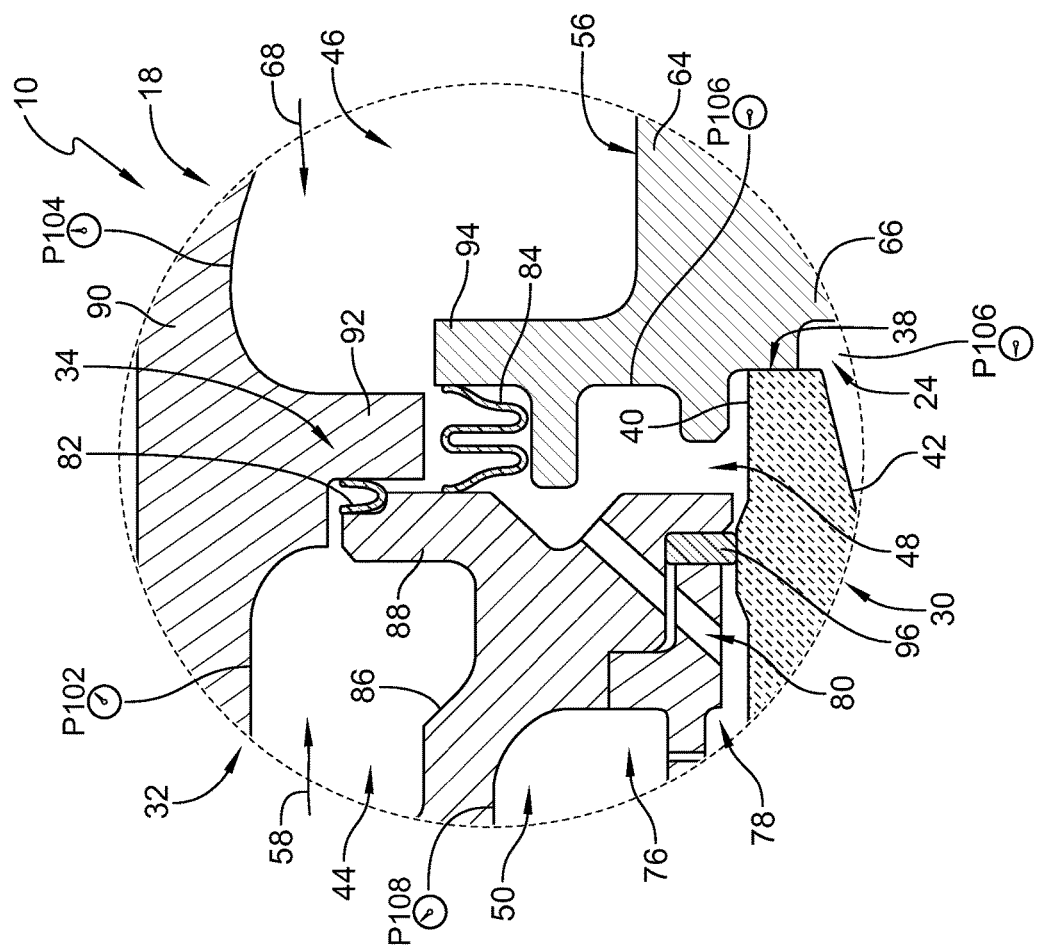
FIG. 4 is a detail view of FIG. 3 showing a seal system included in the turbine section to block the gasses from flowing between the plurality of cavities, the seal system including a plurality of seals arranged to distribute a pressure difference between the cavities across the plurality of seals.

The turbine 18 further includes a blade track 30, a support assembly 32 arranged around the blade track 30, and a seal system 34 as shown in FIGS. 3 and 4. The blade track 30 is arranged around the rotating turbine wheel assembly 20 to block combustion products from passing over blades 22 of the turbine wheel assembly 20 without pushing the blades 22 to rotate. The support assembly is 32 is formed to define a plurality of cavities 44, 46, 48, 50 arranged to receive pressurized air to cool the blade track 30 as it is exposed to the hot combustion products 24 acting on the rotating turbine wheel assembly 20. The seal system 34 is arranged to block the pressurized air from escaping the respective cavities 44, 46, 48, 50 as suggested in FIGS. 3 and 4.

Each cavity 44, 46, 48, 50 is pressurized differently such that a pressure difference exists between the cavities 44, 46, 48, 50 as suggested in FIGS. 3 and 4. The seal system 34 includes a plurality of seals 82, 84 arranged to seal the cavities 44, 46, 48, 50 from one another and to distribute the pressure differences formed between the cavities 44, 46, 48, 50 across the plurality of seals 82, 84. Accordingly, the pressure acting on any one seal 82, 84 is less than the entire pressure drop across the plurality of cavities 44, 46, 48, 50. As a result, the leakage flow around the seals 82, 84 can be reduced when compared to systems with one seal sealing against a large pressure.

Illustratively, the seal system 34 includes a high-pressure seal 82 and an intermediate-pressure seal 84 sealing outward of a trailing edge 38 of the blade track 30 where an aft gas path pressure P106 inside the blade track 30 is less than cavity pressures P102, P104, 108 as shown in FIG. 3. The high-pressure seal 82 is arranged to block fluid communication between a high-pressure retention cavity 44 and an intermediate-pressure bleed cavity 46. The intermediate-pressure seal 84 is arranged to block fluid communication between the intermediate-pressure bleed cavity 46 and a vent cavity 48 that is in fluid communication with the hot combustion products 24. As a result, the pressure difference between the high-pressure retention cavity 44 and the relatively low-pressure vent cavity 48 is distributed across more than one seal.

As shown in FIG. 1, the illustrative aerospace gas turbine engine 10 is cut-away to show that the engine 10 includes the output shaft 12, the compressor 14, the combustor 16, and the turbine 18. The output shaft 12 is configured to be coupled to a propeller, fan, or gearbox and is driven by the turbine 18. The compressor 14 compresses and delivers air to the combustor 16. The combustor 16 mixes fuel with the compressed air received from the compressor 14 and ignites the fuel. The hot combustion products 24 of the combustion reaction in the combustor 16 are directed into the turbine 18 and the turbine 18 extracts work to drive the compressor 14 and the output shaft 12.

The turbine 18 illustratively includes the turbine wheel assembly 20 and the static turbine vane assembly 56 as shown in FIGS. 1 and 2. The turbine wheel assembly 20 includes a plurality of corresponding turbine blades 22 configured to be pushed by the combustion products 24 to cause the turbine wheel assembly 20 to rotate; thereby, driving the rotating components of the compressor 14 and/or the output shaft 12. The vane assembly 56 includes a plurality of corresponding of airfoils 66 that direct the combustion products 24 from the combustor 16 toward the blades 22 of a downstream turbine wheel assembly.

The turbine 18 further includes the blade track 30 that extends around the turbine wheel assembly 20 to block combustion products 24 from passing over the blades 22 without pushing the blades 22 to rotate as suggested in FIG. 3. Combustion products 24 that are allowed to pass over the blades 22 do not push the blades 22 and such passed-over products 24 contribute to lost performance within the engine 10.

The illustrative blade track 30 is concentric with and nested into the support assembly 32 along the central axis 11 of the engine 10 to form a turbine shroud. In the illustrative embodiment, the blade track 30 is a unitary component forming a full hoop. The blade track 30 is a component of one-piece, continuous construction, rather than as a series of joined segments. This construction eliminates gaps that may be formed between parts of a multi-piece (or segmented) blade track. In the illustrative embodiment, the blade track 30 comprises ceramic matrix composite materials.

The blade track 30 includes a leading edge 36, a trailing edge 38, a radial outer surface 40, and a radial inner surface 42 as shown in FIG. 3. The leading edge 36 is located toward a forward end of the gas turbine engine 10. The trailing edge 38 is axially spaced apart from the leading edge 36 toward an aft end of the engine 10. The radial outer surface 40 extends between the leading edge 36 and the trailing edge 38. The radial inner surface 42 is spaced apart from the radial outer surface 40 to locate the radial inner surface 42 radially between the radial outer surface 40 and the central axis 11. The radial inner surface 42 interconnects the leading edge 36 and the trailing edge 38 and interacts with the hot combustion products 24.

In the illustrative embodiment, the support assembly 32 is formed to define the retention cavity 44, the bleed cavity 46, and the vent cavity 48 as shown in FIG. 3. The cavities 44, 46, 48 cool the blade track 30 and other turbine components and seal the support assembly 32 from the hot combustion products 24. The retention cavity 44 is arranged to receive high-pressure air to seal and cool the leading edge 36 and forward end of the blade track 30. The bleed cavity 46 is arranged to receive intermediate-pressure air to seal and cool an aft portion of the turbine 18. The vent cavity 48 is in fluid communication with the hot combustion products 24 and provides a path for any leaked cooling air to join the combustion products 24. In the illustrative embodiment, the support assembly 32 further defines a thermal management chamber 50 configured to receive and direct intermediate-pressure air into the vent cavity 48 to resist the flow of the hot low-pressure combustion products 24 from entering into the vent cavity 48.

The support assembly 32 illustratively includes a carrier 52, a turbine case 54, and the track-retaining vane assembly 56 as shown in FIGS. 3 and 4. The carrier 52 is an annular, round metallic component that is configured to support the blade track 30 in position adjacent the blades 22 of the turbine wheel assembly 20. The turbine case 54 extends around the carrier 52 and supports the carrier 52 and the blade track 30 relative to the central axis 11. The track-retaining vane assembly 56 engages the trailing edge 38 of the blade track 30 to position the blade track 30 axially relative to other static turbine components in the turbine 18.

The seal system 34 includes the high-pressure seal 82 and the intermediate-pressure seal 84 as shown in FIGS. 3 and 4. Each of the seals 82, 84 are annular and extend circumferentially about the central axis 11. In some embodiments, seals 82, 84 may be split rings and/or may be segmented. The high-pressure seal 82 engages the turbine case 54 and the carrier 52 to seal the bleed cavity 46 from the retention cavity 44. The intermediate-pressure seal 84 engages the carrier 52 and the track-retaining vane assembly 56 to seal the bleed cavity 46 from the vent cavity 48.

In the illustrative embodiment, the high-pressure seal 82 has a U-shaped cross-section when viewed circumferentially relative to the central axis 11. The intermediate-pressure seal 84 has a W-shaped cross-section when viewed circumferentially relative to the central axis 11. In other embodiments, the seals 82, 84 may have any other pressure activated cross-sections or other suitably shaped cross-sections.

The carrier 52 and the turbine case 54 cooperate to define the retention cavity 44 as shown in FIG. 3. The retention cavity 44 is in fluid communication with the compressor 14 and is arranged to receive pressurized air from the compressor 14 to seal and cool a forward end and the leading edge 36 of the blade track 30. In the illustrative embodiment, the retention cavity 44 is fluidly connected to a compressor discharge stage 14C of the compressor 14 that directs high-pressure air 58 from the compressor discharge stage 14C into the retention cavity 44.

Illustratively, the carrier 52 includes a support band 86 and an aft flange 88 as shown in FIG. 4. The support band 86 extends axially relative to the central axis 11 to form a portion of the retention cavity 44. The aft flange 88 extends radially outward toward the turbine case 54 to close an aft end of the retention cavity 44. The turbine case 54 includes an outer band 90 and a partition flange 92 as shown in FIG. 4. The outer band 90 of the turbine case extends axially relative to the central axis 11 and is radially spaced apart from the support band 86 of the carrier 52 to define the retention cavity 44. The partition flange 92 extends radially inward toward the carrier 52 and the central axis 11. The partition flange 92 is located adjacent the aft flange 88 to close an aft end of the retention cavity 44 and a forward end of the bleed cavity 46. The high-pressure seal 82 engages the partition flange 92 and the aft flange 88 of the carrier 52 to seal the bleed cavity 46 from the retention cavity 44.

The illustrative carrier 52 is formed to include an annular forward buffer chamber 60 shown in FIG. 3. During operation, the high-pressure air 58 is directed from the retention cavity 44 radially inward through the support band 86 of the carrier 52 toward the blade track 30 into the forward buffer chamber 60. The forward buffer chamber 60 is arranged around the forward end of the blade track 30 to cause the pressurized air 58 to cool the leading edge 36 of the blade track 30. Illustratively, two seals are located in the forward buffer chamber 60 as shown in FIG. 3. The two seals block the combustion products 24 from flowing over the radial outer surface 40 of the blade track 30.

The combustion products 24 have a pressure P110 at the forward end of the blade track 30 as shown in FIG. 3. As the combustion products 24 rotate the turbine blades 22, the pressure drops and, as a result, the combustion products 24 have an average pressure P106 at the aft end of the blade track 30 that is lower than the average pressure P110. As shown in FIG. 3, a W-seal 98 is located radially outward of the blade track 30 to block a pressure P112 from flowing the retention cavity 44 into the gaspath, thereby bypassing the combustor. In the illustrative embodiment, the average pressure P112 is greater than the average pressure P102.

The average pressure P102 of the high-pressure air 58 is greater than the average pressure P110 of the combustion products 24. As such, the high-pressure air 58 is directed into the forward buffer chamber 60 so that, if some of the high-pressure air 58 escapes the forward buffer chamber 60, it cools and seals the turbine components. For example, if the air 58 flows axially forward around the leading edge 36 of the blade track 30, it will resist the pressure P110 of hot combustion products 24 over the blade track 30 at the forward end of the blade track 30 and, as such, it buffers the forward end of the blade track. The air will then join the hot combustion products 24 at the forward end of the blade track 30. If the air 58 flows axially aft, it will flow over the radial outer surface 40 of the blade track 30 toward the trailing edge 38 of the blade track 30 cooling the blade track 30 and join the hot combustion products 24 at the aft end of the blade track 30.

The track-retaining vane assembly 56 includes an outer band 64 and an airfoil 66 as shown in FIG. 3. The outer band 64 engages the trailing edge 38 of the blade track 30 to locate the blade track 30 axially relative to the central axis 11 as shown in FIG. 3. The airfoil 66 extends radially inwardly from the outer band 64 and is configured to direct the hot combustion products 24 into a downstream turbine wheel assembly included in the turbine 18.

The track-retaining vane assembly 56 cooperates with the turbine case 54 to define the bleed cavity 46 as shown in FIG. 3. The outer band 64 is formed to include a forward flange 94 that extends radially outward toward the turbine case 54 as shown in FIG. 4. The forward flange 94 of the outer band 64 and the partition flange 92 of the turbine case 54 cooperate to close the forward end of the bleed cavity 46. The intermediate-pressure seal 84 engages the forward flange 94 and the aft flange 88 to seal the vent cavity 48 from the bleed cavity 46.

The bleed cavity 46 is configured to receive pressurized air from the compressor 14 to cool and seal an aft portion of the turbine 18. In the illustrative embodiment, the bleed cavity 46 is fluidly connected to an intermediate stage 14B of the compressor 14 and the bleed cavity 46 is arranged to receive intermediate-pressure air 68 from the intermediate stage 14B of the compressor 14. Illustratively, the intermediate stage 14B of the compressor 14 is located upstream and axially forward of the compressor discharge stage 14C of the compressor 14.

The intermediate-pressure air 68 has a lower pressure P104 than the pressure P102 of the high-pressure air 58 received by the retention cavity 44. The bleed cavity 46 is separated from the retention cavity 44 by a seal 82 included in the seal system 34 to block the high-pressure air 58 from flowing into the intermediate-pressure bleed cavity 46. The turbine 18 is configured so that, if any air leaks around the seal 82, the high-pressure air 58 overcomes the intermediate-pressure air 68 and flows into the bleed cavity 46 without damaging the turbine 18.

The carrier 52, the track-retaining vane assembly 56, and the blade track 30 cooperate to define the vent cavity 48 as shown in FIGS. 3 and 4. A portion of the hot combustion products 24 having the pressure P106 may flow outward and into the vent cavity 48 during operation of the gas turbine engine 10. The bleed cavity 46 is separated from the vent cavity 48 by the seal 84 to block cooling air from leaking out of the bleed cavity 46. The turbine 18 is configured so that, if air leaks around the seal 84, the pressure 104 of the intermediate-pressure air 68 is greater than and overcomes the low-pressure P106 of the combustion products 24 to block the combustion products from flowing into the support assembly 32 and damaging the turbine 18. In the illustrative embodiment, the vent cavity 48 is located radially inward of the retention cavity 44.

In the illustrative embodiment, the vent cavity 48 is located axially between the retention cavity 44 and the bleed cavity 46 as shown in FIG. 3. Illustratively, portions of the retention cavity 44 and the bleed cavity 46 axially overlap the vent cavity 48.

In the illustrative embodiment, the carrier 52 is further formed to define a radially inward opening thermal management chamber 50 as shown in FIG. 3. The thermal management chamber 50 is arranged to receive pressurized air from the compressor 14 and direct the air onto the blade track 30 to cool the blade track 30. The retention cavity 44 is illustratively axially aligned with and located radially outward of the thermal management chamber 50.

Illustratively, the thermal management chamber 50 is fluidly connected to an early-stage 14A of the compressor 14 and configured to receive early-stage air 70 from the early-stage 14A as suggested in FIG. 1. The early-stage 14A of the compressor 14 is located upstream and axially forward of the intermediate stage 14B and the compressor discharge stage 14C of the compressor.

The early-stage air 70 has an average pressure P108 that is lower than the average pressure P102 of the high-pressure air 58. The average pressure P108 of the early stage air 70 is lower than the average pressure P104 of the intermediate-pressure air 68, but greater than the average pressure P106 of the combustion products 24 at the aft end of the blade track 30. In other embodiments, the thermal management chamber 50 is fluidly connected to stage 14B of the compressor. In other embodiments, the thermal management chamber 50 is fluidly connected to a stage of the compressor that is downstream of stage 14B and upstream of stage 14C.

Illustratively, the early-stage air 70 is conducted through a cross-key 72 that extends through the turbine case 54 into the carrier 52 to locate the carrier 52 relative to the turbine case 54 as shown in FIG. 3. In other embodiments, the cross-key 72 is omitted and the air 70 is conducted into the carrier 52 via alternative flow paths and/or conduits. The carrier 52 further includes a distribution plate 74 that extends axially through the thermal management chamber 50 to partition the thermal management chamber 50 into a radial outer distribution cavity 76 and a radial inner cooling cavity 78.

The radial outer distribution cavity 76 is configured to receive and distribute the early-stage cooling air 70 circumferentially around the central axis 11 to cause the air 70 received in the thermal management chamber 50 to have a generally uniform pressure. The distribution plate 74 is formed to include a plurality of holes arranged to direct the early-stage cooling air 70 out of the distribution cavity 76 into the cooling cavity 78 toward the radial outer surface 40 of the blade track 30.

In the illustrative embodiment, the cooling cavity 78 is fluidly connected to the vent cavity 48 as shown in FIG. 4. The carrier 52 is arranged to direct the early-stage air 70 across the radial outer surface 40 of the blade track 30 into the vent cavity 48 through an aft passage 80. As such, the pressure P108 of the early-stage air 70 overcomes the low-pressure P106 of the combustion products 24 at the aft end of the blade track 30 to block the combustion products 24 from flowing into the thermal management chamber 50 of the support assembly 32. A seal 96 is positioned between the carrier 52 and the aft end of the blade track 30 to block excessive air leak out and to allow for relative thermal growth between the carrier 52 and the blade track 30. Illustratively, the seal 96 is a piston ring seal 96.

In illustrative embodiments, the one-piece full hoop of the blade track 30 encourages uniform radial expansion of the blade track 30 at high temperatures. Uniform radial expansion of the blade track 30 allows the blade track 30 to remain round at high temperatures which results in the ability to further maintain a small gap between the blades 22 and the blade track 30 while hot combustion products 24 are being directed over the blades 22 and the blade track 30.

The blade track 30 is illustratively made from a ceramic material; and, more particularly, a ceramic matrix composite (CMC) including silicon carbide fibers and silicon carbide matrix. The blade track 30 has a relatively low coefficient of thermal expansion because of its composition. Considering the relatively small coefficient of thermal expansion, the blade track 30 can be designed to maintain a small gap between the blade track 30 and the blades 22 thereby improving performance of the engine 10.

According to at least one method of operating the gas turbine engine 10, the retention cavity 44 is fed with the flow of high-pressure air 58 having a first pressure P102. The bleed cavity 46 is fed with the flow of intermediate-pressure air 68 having a second pressure P104. The vent cavity 48 is fed with a flow of low-pressure air 70 having a third pressure P108. The seal 82 is provided between the retention cavity 44 and the bleed cavity 46 to block the flow of air 58 from escaping the retention cavity 44 and entering the bleed cavity 46. The seal 84 is provided between the bleed cavity 46 and the vent cavity 48 to block the flow of air 68 from escaping the bleed cavity 46 and entering the vent cavity 48. In the illustrative embodiment, the average pressure P102 of the flow of air 58 is greater than the average pressure P104, P106 of the air 68, 24 and the average pressure P104 of the flow of air 68 is greater than the average pressure P106 of the flow of air 24.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a blade track arranged around a central axis of the gas turbine engine, the blade track having a leading edge, a trailing edge axially spaced apart from the leading edge, a radial outer surface that extends between the leading and trailing edges, and a radial inner surface spaced apart from the radial outer surface,
a support assembly arranged around the blade track to support the blade track relative to the central axis, the support assembly being formed to define a retention cavity configured to receive relatively high-pressure compressor air that is directed to the leading edge of the blade track to resist gasses from flowing past the leading edge over the radial outer surface of the blade track, a vent cavity configured to receive relatively low-pressure compressor air that is directed to the trailing edge of the blade track to resist the gasses from flowing past the trailing edge over the radial outer surface of the blade track, and a bleed cavity fluidly interconnecting the retention cavity with the vent cavity and configured to receive intermediate-pressure compressor air, and
a seal system including a first seal configured to block fluid communication between the retention cavity and the bleed cavity and a second seal configured to block fluid communication between the bleed cavity and the vent cavity so that a pressure difference across either of the first and second seals is less than a pressure difference between the retention cavity and the vent cavity.

2. The gas turbine engine of claim 1, further comprising a compressor having a plurality of compressor stages and the bleed cavity is fluidly connected to a first of the plurality of compressor stages.

3. The gas turbine engine of claim 2, wherein the retention cavity is fluidly connected to a second of the plurality of compressor stages and the second of the plurality of compressor stages is located downstream of the first of the plurality of compressor stages.

4. The gas turbine engine of claim 1, wherein the support assembly includes a carrier arranged radially outward of and around the blade track and a track-retaining vane assembly that cooperate with the blade track to define the vent cavity, the track-retaining vane assembly including an outer band that engages the trailing edge of the blade track and a static airfoil that extends radially inward of the outer band.

5. The gas turbine engine of claim 4, wherein the support assembly further includes a turbine case arranged around the carrier and the turbine case cooperates with the carrier to define the retention cavity.

6. The gas turbine engine of claim 4, wherein the support assembly further includes a turbine case arranged around the track-retaining vane assembly and the carrier and the track-retaining vane assembly cooperate to define the bleed cavity.

7. The gas turbine engine of claim 1, wherein the support assembly includes a carrier that cooperates with the blade track to define a thermal management chamber therebetween.

8. The gas turbine engine of claim 7, wherein the support assembly further includes a distribution plate coupled to the carrier, the distribution plate extends axially through the thermal management chamber to partition the thermal management chamber into a radial outer distribution cavity configured to receive and distribute cooling air circumferentially around the central axis and a radially inner cooling cavity, and the distribution plate is formed to include a plurality of holes arranged to direct the cooling air out of the distribution cavity into the cooling cavity toward the radial outer surface of the blade track.

9. The gas turbine engine of claim 8, wherein cooling cavity is in fluid communication with the vent cavity.

10. The gas turbine engine of claim 8, further comprising a compressor having a plurality of compressor stages, the thermal management chamber is fluidly connected to a first of the plurality of compressor stages, the bleed cavity is fluidly connected to a second of the plurality of compressor stages, the retention cavity is fluidly connected to a third of the plurality of compressor stages, the third of the plurality of compressor stages is located downstream of the first and second of the plurality of compressor stages, and the second of the plurality of compressor stages is located downstream of the first of the plurality of compressor stages.

11. A gas turbine engine comprising
a turbine case arranged around a central axis of the gas turbine engine,
an annular turbine shroud arranged to define an inner flow path configured to conduct hot, low-pressure gasses axially through the annular turbine shroud, the annular turbine shroud located radially between the turbine case and the central axis to define a retention cavity located between the annular turbine shroud and the turbine case,
a blade-track retainer located radially between the turbine case and the central axis to define a bleed cavity located between the blade-track retainer and the turbine case and the blade-track retainer and the annular turbine shroud cooperate to define a vent cavity in fluid communication with the low-pressure gasses in the inner flow path,
a first seal engaged with the turbine case and the turbine shroud to block air from escaping the retention cavity and flowing into one of the bleed cavity and the vent cavity, and
a second seal engaged with the turbine shroud and the blade-track retainer to block air from escaping the bleed cavity and flowing into the vent cavity so that a pressure difference across either of the first and second seals is less than a pressure difference between a pressure of the air in the retention cavity and a pressure of the low-pressure gasses.

12. The gas turbine engine of claim 11, wherein the annular turbine shroud includes a full hoop blade track comprising ceramic materials and a carrier comprising metallic materials and arranged around the blade track.

13. The gas turbine engine of claim 12, wherein the carrier includes a support band that extends axially relative to the central axis to form a portion of the retention cavity and an aft flange that extends radially outward toward the turbine case to close an aft end of the retention cavity and the first seal engages the aft flange of the carrier.

14. The gas turbine engine of claim 13, wherein the turbine case includes an outer band spaced apart from the support band of the carrier and a partition flange that extends radially inward toward the central axis, the partition flange is located adjacent the aft flange of the carrier, and the first seal further engages the partition flange.

15. The gas turbine engine of claim 13, wherein the blade-track retainer includes a forward flange that extends radially outward toward the turbine case to close a forward end of the bleed cavity and the second seal engages the aft flange of the carrier and the forward flange of the blade-track retainer.

16. The gas turbine engine of claim 11, further comprising a compressor having a plurality of compressor stages and the bleed cavity is fluidly connected to a first of the plurality of compressor stages.

17. The gas turbine engine of claim 16, wherein the retention cavity is fluidly connected to a second of the plurality of compressor stages and the second of the plurality of compressor stages is located downstream of the first of the plurality of compressor stages.

18. The gas turbine engine of claim 11, wherein the annular turbine shroud includes a blade track, a carrier arranged circumferentially around the blade track to define a thermal management chamber therebetween, and a distribution plate coupled to the carrier to partition the thermal management chamber into a radial outer distribution cavity configured to receive and distribute cooling air circumferentially around the central axis and a radially inner cooling cavity that is in fluid communication with the vent cavity.

19. A method of operating a turbine of a gas turbine engine, the method comprising
feeding a retention cavity with a first flow of air having a first pressure,
feeding a bleed cavity with a second flow of air having a second pressure,
feeding a vent cavity with a third flow of air having a third pressure,
providing a first seal between the retention cavity and the bleed cavity to block the first flow of air from escaping the retention cavity and entering the bleed cavity, and
providing a second seal between the bleed cavity and the vent cavity to block the second flow of air from escaping the bleed cavity and entering the vent cavity.

20. The method of claim 19, wherein the first pressure is greater than the second and third pressures and the second pressure is greater than the third pressure.

* * * * *